US011186524B2

(12) United States Patent
Saleem et al.

(10) Patent No.: US 11,186,524 B2
(45) Date of Patent: Nov. 30, 2021

(54) LUMINESCENT CONCRETE COMPOSITION AND PRODUCT

(71) Applicant: Imam Abdulrahman Bin Faisal University, Dammam (SA)

(72) Inventors: Muhammad Saleem, Dammam (SA); Nawaf Isam Ahmed Blaisi, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 505 days.

(21) Appl. No.: 16/151,994

(22) Filed: Oct. 4, 2018

(65) Prior Publication Data
US 2020/0109089 A1 Apr. 9, 2020

(51) Int. Cl.
| | |
|---|---|
| *C04B 41/50* | (2006.01) |
| *C09K 11/02* | (2006.01) |
| *C09K 11/77* | (2006.01) |
| *C04B 28/04* | (2006.01) |
| *C04B 14/06* | (2006.01) |
| *C04B 41/00* | (2006.01) |
| *C04B 41/68* | (2006.01) |
| *C04B 14/30* | (2006.01) |

(Continued)

(52) U.S. Cl.
CPC .......... *C04B 41/5098* (2013.01); *C04B 14/06* (2013.01); *C04B 14/303* (2013.01); *C04B 28/04* (2013.01); *C04B 41/009* (2013.01); *C04B 41/68* (2013.01); *C09K 11/02* (2013.01); *C09K 11/77* (2013.01); *C04B 2103/54* (2013.01); *C04B 2111/00508* (2013.01); *C04B 2111/807* (2013.01)

(58) Field of Classification Search
None
See application file for complete search history.

(56) References Cited

U.S. PATENT DOCUMENTS

| | | | |
|---|---|---|---|
| 2004/0011256 A1* | 1/2004 | Beimel | ................ C09K 11/643 106/712 |
| 2006/0033082 A1 | 2/2006 | Gao | |

(Continued)

FOREIGN PATENT DOCUMENTS

| | | |
|---|---|---|
| CN | 1736931 A | 2/2006 |
| KR | 10-2017-0100219 A | 9/2017 |

OTHER PUBLICATIONS

Andrew Wiese, et al., "Assessing Performance of Glow-in-the-Dark Concrete", Transportation Research Record: Journal of the Transportation Board, vol. 2508, Jun. 12, 2018, 2 pages (Abstract only).

(Continued)

*Primary Examiner* — Jeffrey D Washville
(74) *Attorney, Agent, or Firm* — Oblon, McClelland, Maier & Neustadt, L.L.P.

(57) ABSTRACT

Luminescent concrete compositions containing cement, fine aggregates such as sand, and a phosphor such as strontium aluminate. Glow-in-the-dark concrete products made therefrom and methods of producing such concrete products are also specified. The glow-in-the-dark concrete products demonstrate good mechanical strength (e.g. compressive strength) and skid resistance. The addition of phosphorescent strontium aluminate provides luminance that persists for up to 10 hours to the concrete products.

12 Claims, 7 Drawing Sheets

(51) Int. Cl.
    *C04B 111/00*     (2006.01)
    *C04B 103/54*     (2006.01)
    *C04B 111/80*     (2006.01)

(56) References Cited

U.S. PATENT DOCUMENTS

| | | |
|---|---|---|
| 2006/0065879 A1 | 3/2006 | Beimel |
| 2015/0274593 A1 | 10/2015 | Jesus De Sequeira Serra Nunes |
| 2018/0346806 A1* | 12/2018 | Hivert .................... C09D 5/22 |

OTHER PUBLICATIONS

F. Giuliani, et al., "Photoluminescent road surface dressing; a first laboratory experimental investigation", Materials & Techniques, vol. 102, No. 6-7, Article 603, Dec. 2, 2014, 9 pages (Abstract only).

Tom Kuennen, "Glow in the Dark Concrete?", Concrete Products, http://www.concreteproducts.com, Apr. 7, 2015, 2 pages.

Tom Kuennen, "Light-emitting Concrete", TSP2 Pavement Preservation, https://tsp2pavement.pavementpreservation.org, Jul. 16, 2015, 1 page.

\* cited by examiner

LUMINESCENT CONCRETE COMPOSITION AND PRODUCT

STATEMENT OF ACKNOWLEDGEMENT

This project was prepared with financial support from the Deanship of Scientific Research (DSR) at Imam Abdulrahman Bin Faisal University, Kingdom of Saudi Arabia under the project ID 2017-006-Eng.

BACKGROUND OF THE INVENTION

Technical Field

The present disclosure relates to luminescent concrete compositions involving phosphorescent strontium aluminate particles, cement, and fine aggregates, glow-in-the-dark concrete products made therefrom, and methods for producing these concrete products.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Researchers are continuously looking to develop new types of material with improved performance by using innovative methods. One such area of interest is luminance, Andrew et al. [Andrew, A., Taylor, W., Tao, B. and Weiss, J. (2015): "Assessing the Performance of Glow in the Dark Concrete", *Transportation Research Record: Journal of the Transportation Research Board*, 41, pp. 1-14. DOI: 10.3141/2508-04, incorporated herein by reference in its entirety] developed a luminescent concrete sealant that can be applied in a variety of ways by mixing glow-in-the-dark powder in a lubricant. However, poor durability of the developed sealant limits its viability for practical applications. As a result, the developed sealant only has limited usage in esthetical applications.

Throughout the last decade, translucent concrete has been a topic of interest in both academic and applied engineering sectors. Translucent Concrete was first invented in 2001 by Hungarian architect Aron Losonczi [Alejandro, F., Hanna, K. and Fastag, K. (2004): "Design and manufacture of translucent architectural pre cast panels", *Coolest Inventions Tokyo*, Time Magazine, November 29, and Carl, H. (2004): "Seeing the future of construction through translucent concrete", *The Associated Press*, http://www.seattlepi.com/business/181281_translucent08.html, each incorporated herein by reference in their entirety]. Since its advent, the application of translucent concrete has been limited to architectural and esthetical purposes. Research effort was devoted to improve the durability [Basra, F., Roaa, M., Doaa, F., and Mamoun, A. (2013): "Basics of light transmitting concrete." *Global Adv. Res. J. Eng.*, 2(3), 76-83; and He, J., Zhou, Z., and Ou, J. (2011). "Study on smart transparent concrete product and its performances." $6^{th}$ *Int. Workshop on Advanced Smart Materials and Smart Structures Technology*, International Association for Experimental Structural Engineering (IAESE), and the Asian-Pacific Network of Centers for Research in Smart Structures Technology (ANCRiSST), Dalian, China 380-388, each incorporated herein by reference in their entirety] and to lower the cost by embedding optical fibers in concrete materials [Saleem, M., Shami, M. & Najjar, M. (2016): "Development of Smart Material Lane Separator for Increased Traffic Safety", *Journal of Construction Engineering and Management*. DOI: 10.1061/(ASCE)CO.1943-7862.0001240; Saleem, M. (2016): "Investigating the effect of impact loading generated due to moving truck wheel on smart road lane separator." *Qassim Univ. J. Eng. Comput. Sci*; Sawant, A., Jugdar, R., and Sawant, A. (2014). "Light transmitting concrete by using optical fiber" *Int. J. Invent. Eng. Sci.*, 3(1), 23-28; and Orman, A., and Hamou, A. T. (2016): "Performance of glass-powder concrete in field applications." *Constr. Build. Mater.*, 109, 84-95, each incorporated herein by reference in their entirety]. Furthermore, researchers have also considered using optical fibers as sensors by embedding them in a concrete structure to evaluate load bearing performance and detect cracks in the structure [Kalymnios, D. (2005): "Plastic optical fibers (POF) in sensing—Current status and prospects." $17^{th}$ *Int. Conf. on Optical Fiber Sensors, International Society of Optics and Photonics (SPIE)*. Bruges, Belgium, 97-104; Kim, K., Kollar, S., and Springer, S. G. (2011): "A model of embedded fiberoptic Fabry-Perot temperature and strain sensors." *J. Comput. Mater.*, 27(17), 1618-1662; Shakir, A., Hassan, H., and Safaa, A. (2014): "Effect of plastic optical fiber on some properties of translucent concrete." *Eng. Tech. J.*, 32(12), 2846-2861; and Craig, C. F. (2001): "How Fiber Optics Work", PhD extracts, http://communication.howstuffworks.com/fiber-optic-communications/fiber-optic7.html, each incorporated herein by reference in their entirety]. However, these approaches are not only costly compared to non-destructive testing, but also require skilled labor for construction and maintenance [Saleeam, M., Al-Kutti, W., Al-Akhras, N. and Haider, H. (2016). "Non-Destructive Testing Method to Evaluate the Load Carrying Capacity of Concrete Anchors", *Journal of Construction Engineering and Management*, 142(5), 17-29. DOI: 10.1061/(ASCE)CO.1943-7862.0001105, incorporated herein by reference in its entirety]. FIG. 1 presents a glow-in-the-dark bicycle way unveiled in the Netherlands. The material used on the bicycle way required electrical excitation to generate luminescence. It was demonstrated that the material glowed for up to 8 hours, however, the glow-ability was reduced when wet. In addition, the durability of the material was not suited for extreme high temperature (McGrath, T. (2014). "The Netherlands debuts a futuristic highway that glows in the dark." (https://www.pri.org/stories/2014-04-15/netherlands-debuts-futuristic-highway-glows-dark) (May 20, 2018); and BBC. (2014): "Glow in the dark road unveiled in the Netherlands", (http://www.bbc.com/news/technology-27021291) (May 21, 2018), each incorporated herein by reference in their entirety].

Before implementing new construction materials it is necessary to thoroughly assess the environmental impacts and long-term effects of such materials on the well-being of humans and environment. Potential risks such as direct human exposure and leaching, which can lead to contamination of subsoil resources [Blaisi, N. I., Cheng, W., Roessler, J., Townsend, T., Al-Abid, S. (2015). "Evaluation of the Impact of Lime Softening Waste Disposal in Natural Environments." *Journal of Waste Management*, 43, pp. 524-532, ISSN 0956-053X.doi: 10.1016/j.wasman.2015.06.015, incorporated herein by reference in its entirety] should be investigated to evaluate the suitability of new materials. In this regards, main questions that are needed to be investigated on GiD based materials used on infrastructure projects include: (1) is the glow-in-the-dark material made from environmentally friendly substances; (2) does the glow-in-the-dark pavement leach any pollutant into the groundwater at levels greater than those outlined in soil and groundwater cleanup target levels by US EPA; and (3) if leaching of trace amounts of pollutants does occur, what are some of the best practices to dispose of the pavement when it reaches the end of life cycle.

It is evident that the application of GiD material is hampered with durability issues and lack of sufficient knowledge related to their environmental impact. In view of the foregoing, one objective of the present disclosure is to provide luminescent concrete compositions which utilize phosphorescent strontium aluminate particles, cement, and fine aggregates (e.g. sand). A further objective of the present disclosure is to provide glow-in-the-dark concrete products based on said luminescent concrete compositions and to provide methods for manufacturing said glow-in-the-dark concrete products.

The present disclosure details the development of durable glow-in-the-dark (GiD) amended concrete that can be used for various infrastructure purposes. New types of GiD interlock blocks have been developed by replacing the top layer with a GiD based mortar. This allows the interlocking blocks to absorb energy during the day time and release the stored energy in the form of visible light during the night time. Furthermore, the present disclosure also addresses the impact of the GiD materials on the environment and human health. Detailed environmental testing was conducted on GiD powder and GiD amended concrete to judge their suitability for use on infrastructures.

BRIEF SUMMARY OF THE INVENTION

According to a first aspect, the present disclosure relates to a luminescent concrete composition comprising a hydraulic cement, a fine aggregate comprising sand, and phosphorescent strontium aluminate particles, wherein a weight ratio of the strontium aluminate particles to the fine aggregate is in the range of 1:2 to 1:20, and the luminescent concrete composition is devoid of a superplasticizer.

In one embodiment, the phosphorescent strontium aluminate particles comprise a rare earth element doped strontium aluminate.

In one embodiment, the rare earth element is at least one selected from the group consisting of cerium, dysprosium, europium, and neodymium.

In one embodiment, the rare earth element doped strontium aluminate further comprises a promoter selected from the group consisting of boron, lithium, sodium, potassium, magnesium, calcium, barium, chromium, and manganese.

In one embodiment, the phosphorescent strontium aluminate particles have an average particle size of 1-15 μm.

In one embodiment, the sand has a bulk specific gravity of 2.2-2.8, and a water absorption of 0.2%-1.0%.

In one embodiment, the luminescent concrete composition has a weight percentage of the fine aggregate ranging from 35-60 wt % relative to a total weight of the luminescent concrete composition.

In one embodiment, the hydraulic cement is an ordinary Portland cement.

In one embodiment, the luminescent concrete composition has a weight percentage of the hydraulic cement ranging from 30-60 wt % relative to a total weight of the luminescent concrete composition.

In one embodiment, the luminescent concrete composition consists essentially of the hydraulic cement, the fine aggregate comprising sand, and the phosphorescent strontium aluminate particles, wherein a weight ratio of the strontium aluminate particles to the fine aggregate is in the range of 1:2 to 1:20.

According to a second aspect, the present disclosure relates to a luminescent concrete slurry comprising the luminescent concrete composition of the first aspect, and 10-25 wt % water relative to a total weight of the luminescent concrete slurry.

According to a third aspect, the present disclosure relates to a glow-in-the-dark concrete block including a surface layer containing a cured form of the luminescent concrete slurry of the second aspect, and a base concrete block, wherein at least a portion of a surface of the base concrete block is coated by the surface layer.

In one embodiment, the surface layer has a thickness of 1-20 mm, and a thickness ratio of the surface layer to the base concrete block is in the range of 0.02:1 to 0.2:1.

In one embodiment, the base concrete block comprises a cured form of a concrete slurry comprising cement, a fine aggregate comprising sand, a coarse aggregate comprising limestone, and water, and which is devoid of phosphorescent strontium aluminate particles.

In one embodiment, the limestone has an average particle size of 2-15 mm, a bulk specific gravity of 2.0-3.0, and a water absorption of 1.0%-3.0%.

In one embodiment, the glow-in-the-dark concrete block has an intensity of glow of 2-15 candelas per square meter for a period of 0.1-10 hours upon excitation with sun light at an intensity of 50-300 watts for 2-20 minutes.

In one embodiment, the glow-in-the-dark concrete block has a compressive strength of 43-50 MPa according to ASTM C936/C936M.

In one embodiment, the surface layer has a skid resistance value of 100-150.

In one embodiment, a volume of the base concrete block is greater than that of the surface layer.

According to a fourth aspect, the present disclosure relates to a luminescent concrete material comprising a cured form of the luminescent concrete slurry of the second aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
FIG. 1 is a picture showing a glow-in-the-dark (GiD) bicycle way in the Netherlands.

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a luminescent concrete composition comprising a hydraulic cement, a fine aggregate comprising sand, and phosphorescent strontium aluminate particles. The luminescent concrete composition disclosed herein refers to a dry, un-hydrated composition, and all recited weight ratios related to the concrete composition are based on the dry composition. A luminescent concrete slurry, which is wet and hardens over time, may be formed once water is added to the luminescent concrete composition.

As used herein, the terms "luminescent" or "luminescence" describe a material that emits light upon excitation from a non-thermal source such as chemical reactions, electrical energy, electromagnetic rays, and mechanical stress, etc. There are different types of luminescence categorized by excitation source, e.g. bioluminescence originated from biochemical reactions in a living organism, mechanoluminescence generated by mechanical stress, and photoluminescence resulted from absorption of photons. Similar to fluorescence, phosphorescence is a form of photoluminescence involving relative slow emission of light by a substance that has absorbed light or other electromagnetic radiation. However, unlike fluorescence, where the substance would cease to glow almost immediately upon removal of the excitation source, phosphorescent materials would continue to glow and emit light for some time after the radiation source has been turned off. Hence, it is a persistent phenomenon compared to fluorescence. Phosphorescence is often the mechanism used for "glow-in-the-dark" (GiD) materials, which are charged by exposure to light. Unlike the relatively swift reactions in fluorescence such as those seen in a common fluorescent tube, GiD materials store the absorbed energy for a longer time at a metastable state. A phosphorescence lifetime is the average time needed for the stored energy to get released in a phosphorescent material.

In one or more embodiments, the luminescent concrete composition of the present disclosure comprises phosphorescent strontium aluminate particles. Strontium aluminate having a formula of $SrAl_2O_4$ is a nonflammable, pale yellow, monoclinic crystalline powder. Strontium aluminate may be present in other formulae such as $SrAl_4O_7$ with a monoclinic crystalline structure, $Sr_3Al_2O_6$ with a cubic crystalline structure, $SrAl_{12}O_{19}$ with a hexagonal crystalline structure, and $Sr_4Al_{14}O_{25}$ with an orthorhombic crystalline structure. In one or more embodiments, the phosphorescent strontium aluminate particles used herein comprise strontium aluminate with a formula of $SrAl_2O_4$. It is equally envisaged that strontium aluminate with other formulae including, but not limited to, $SrAl_4O_7$, $Sr_3Al_2O_6$, $SrAl_{12}O_{19}$, and $Sr_4Al_{14}O_{25}$ may be used in addition to, or in lieu of $SrAl_2O_4$.

When doped with small amounts of a suitable dopant such as rare earth and/or transition metal elements, strontium aluminate may act as an efficient photoluminescent phosphor. In one or more embodiments, the phosphorescent strontium aluminate particles of the present disclosure comprise a rare earth element doped strontium aluminate. In a preferred embodiment, the rare earth element is at least one selected from the group consisting of cerium, dysprosium, europium, and neodymium. Exemplary rare earth element doped strontium aluminates include, but are not limited to, cerium doped strontium aluminate, europium doped strontium aluminate, europium and neodymium doped strontium aluminate, and europium and dysprosium doped strontium aluminate (e.g. $Sr_{0.95}Eu_{0.02}Dy_{0.03}Al_2O_4$, and $Sr_{3.84}Eu_{0.06}Dy_{0.10}Al_{14}O_{25}$). In one embodiment, the rare earth element may be present at a molar amount of 2-15 mol %, preferably 3-10 mol %, more preferably 4-8 mol % relative to the amount of strontium aluminate. However, in certain embodiments, the molar amount of the rare earth element may be less than 2 mol % or greater than 15 mol % relative to the amount of strontium aluminate.

In one or more embodiments, the rare earth element doped strontium aluminate further comprises one or more promoters selected from the group consisting of boron, lithium, sodium, potassium, magnesium calcium, barium, chromium, and manganese. Exemplary rare earth element doped strontium aluminates further comprising a promoter include, but are not limited to, cerium doped strontium aluminate promoted by magnesium, cerium doped strontium aluminate promoted by manganese, and europium and dysprosium doped strontium aluminate promoted by boron, lithium, sodium, potassium, magnesium, calcium, barium, or chromium. In one embodiment, the promoter may be present at a molar amount of 0.005-5 mol %, preferably 0.05-1 mol %, more preferably 0.1-0.5 mol % relative to the amount of strontium aluminate. However, in certain embodiments, the molar amount of the promoter may be less than 0.005 mol % or greater than 5 mol % relative to the amount of strontium aluminate. When present, the promoter may be doped on strontium aluminate.

As used herein, "doped" refers to the rare earth element and/or the promoter being affixed on an outer surface of strontium aluminate or within pore spaces of strontium aluminate. The rare earth element and/or the promoter may be affixed via strong atomic bonds (e.g. metallic, ionic, and covalent bonds) and/or weak interactions such as van der Wools, or hydrogen bonds. For example, the phosphorescent strontium aluminate particles may comprise the rare earth element (e.g. europium and dysprosium) embedded in and become integral with the crystalline lattice structure of the strontium aluminate.

As defined herein, an average particle size refers to the longest linear dimension of a particle. In one or more embodiments, the phosphorescent strontium aluminate particles have an average particle size of 0.5-15 µm, preferably 1-12 µm, preferably 2-10 µm, preferably 3-8 µm, preferably 4-7 µm, preferably 5-6 µm. As used herein, the coefficient of variation or relative standard deviation is expressed as a percentage and defined as the ratio of the particle size standard deviation ($\sigma$) to the particle size mean ($\mu$) multiplied by 100. In a preferred embodiment, the phosphorescent strontium aluminate particles have a coefficient of variation of less than 50%, preferably less than 40%, preferably less than 30%, preferably less than 20%, preferably less than 15%, preferably less than 10%. In a preferred embodiment, the phosphorescent strontium aluminate particles have a particle size distribution ranging from 10% of the average particle size to 200% of the average particle size, preferably 50-150%, preferably 75-125%, preferably 80-120%, preferably 90-110%.

Photophysical properties of a strontium aluminate phosphor including absorption-emission profile, phosphorescence lifetime, and quantum yield may be dependent on various factors including molecular formula of strontium aluminate, chemical identities of the dopant and the promoter, internal crystal structure (e.g. crystal packing) of the strontium aluminate phosphor, and particle size of the phosphor. In one embodiment, the phosphorescent strontium aluminate particles have a phosphorescence emission peak of 400-700 nm, preferably 425-675 nm, preferably 450-650 nm, preferably 475-625 nm, preferably 500-600 nm, preferably 525-575 nm at an excitation wavelength of 200-425 nm, preferably 225-400 nm, preferably 250-375 nm, preferably 275-350 nm, preferably 300-325 nm. In one embodiment, the phosphorescent strontium aluminate particles used herein have a phosphorescence lifetime ranging from 0.1-40 hours, preferably 1-20 hours, preferably 2-15 hours, preferably 3-10 hours, preferably 4-8 hours. In certain embodiments, the phosphorescent strontium aluminate particles have a phosphorescence lifetime less than 0.1 hour or greater than 40 hours.

As used herein, quantum yield ($\Phi$) refers to the phosphorescence quantum yield and gives the efficiency of the phosphorescence process. It is defined as the ratio of the number of photons emitted relative to the number of photons absorbed. In one embodiment, the phosphorescent strontium aluminate particles used herein have a quantum yield in a range of 0.02-0.9, preferably 0.05-0.8, preferably 0.1-0.7, preferably 0.2-0.6, preferably 0.3-0.5 for phosphorescence emission peak of 400-700 nm, preferably 425-675 nm, preferably 450-650 nm, preferably 475-625 nm, preferably 500-600 nm, preferably 525-575 nm at an excitation wavelength of 200-425 nm, preferably 225-400 nm, preferably 250-375 nm, preferably 275-350 nm, preferably 300-325 nm.

The phosphorescent strontium aluminate particles disclosed herein demonstrate good compatibility with other ingredients of the luminescent concrete composition such as hydraulic cements and fine aggregates discussed hereinafter. In one embodiment, the difference of aforementioned phosphorescence emission peaks between the phosphorescent strontium aluminate particles present in the luminescent concrete composition and the phosphorescent strontium aluminate particles alone is less than 35%, preferably less than 25%, more preferably less than 15%, such as for example 5-30%, 10-20%, or 12-14%. In another embodiment, the difference of phosphorescence quantum yields between the phosphorescent strontium aluminate particles present in the luminescent concrete composition and the phosphorescent strontium aluminate particles alone is less than 25%, preferably less than 20%, more preferably less than 10%, such as for example, 2-20%, 5-15%, or 8-12%.

The phosphorescent strontium aluminate particles used herein may be prepared by techniques generally known to those skilled in the art including, but not limited to, sol-gel process, chemical precipitation, hydrothermal co-precipitation, solid-state reaction, and combustion synthesis technique. Alternatively, the phosphorescent strontium aluminate particles used herein may be available from commercial vendors including, without limitation, Sigma Aldrich, Alfa Aesar, United Mineral and Chemical Corp., and Techno Glow Products.

In one embodiment, the luminescent concrete composition has a weight percentage of the phosphorescent strontium aluminate particles ranging from 1-30% relative to a total weight of the luminescent concrete composition, preferably 3-28%, preferably 5-25%, preferably 8-20%, preferably 10-18%, preferably 12-15% relative to the total weight of the luminescent concrete composition.

As defined herein, the term "bulk specific gravity" refers to a ratio of the weight of a bulk volume of a substance to the weight of an equal volume of a reference substance, e.g. water. As used herein, water absorption refers to the penetration of water into aggregate particles with resulting increase in particle weight.

In one or more embodiments the luminescent concrete composition of the present disclosure comprises a fine aggregate. In one embodiment, the fine aggregate used herein has an average particle size in a range of 0.05-1 mm, preferably 0.1-0.8 mm, preferably 0.2-0.6 mm, preferably 0.3-0.5 mm. In a preferred embodiment, the fine aggregate used herein has a bulk specific gravity of 2.0-3.0, preferably 2.2-2.9, preferably 2.3-2.8, preferably 2.4-2.7, or about 2.66. In a preferred embodiment, the luminescent concrete composition of the present disclosure comprises a fine aggregate having a water absorption of 0.2-1.0%, preferably 0.3-0.8%, preferably 0.4-0.7%, or about 0.6%.

In one or more embodiments, the luminescent concrete composition has a weight percentage of the fine aggregate ranging from 35-60% relative to a total weight of the luminescent concrete composition, preferably 38-58%, preferably 40-55%, preferably 42-52%, preferably 45-50%, preferably 46-48% relative to the total weight of the luminescent concrete composition. In a preferred embodiment, a weight ratio of the strontium aluminate particles to the fine aggregate is in the range of 1:2 to 1:20, preferably 1:3 to 1:16, preferably 1:4 to 1:12, preferably 1:5 to 1:10, preferably 1:6 to 1:9, preferably 1:7 to 1:8.

In a preferred embodiment, the fine aggregate is sand, more preferably desert sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm).

In a preferred embodiment, the fine aggregate the luminescent concrete composition is desert sand with an average particle size of less than 800 μm, preferably less than 600 μm, preferably less than 500 μm, preferably less than 400 μm, preferably less than 300 μm, preferably less than 200 μm, preferably less than 100 μm, such as for example 500-700 μm, preferably 525-675 μm, preferably 550-650 μm. As used herein, the coefficient of variation or relative standard deviation is expressed as a percentage and defined as the ratio of the particle size standard deviation (σ) to the particle size mean (μ) multiplied by 100. In a preferred embodiment, the fine aggregate of the concrete composition is dune sand having a coefficient of variation of less than 35%, preferably less than 30%, preferably less than 25%, preferably less than 20%, preferably less than 15%, preferably less than 10%. In a preferred embodiment, the fine aggregate of the luminescent concrete composition is desert sand having a particle size distribution ranging from 10% of the average particle size to 200% of the average particle size, preferably 50-150%, preferably 75-125%, preferably 80-120%, preferably 90-110%. Even though the phosphorescent strontium aluminate particles may have a particle size similar to the fine aggregate used herein, it is considered that the phosphorescent strontium aluminate particles are a separate and distinct component from the fine aggregate in the currently disclosed luminescent concrete composition.

As used herein, the term "cement" refers to a composition or substance with one or more constituents that are capable of binding other materials together once cured. Generally, cement may include a number of dry constituents chosen based on the desired ratio or class of cement to be produced. Thus, cement refers to a dry composition before curing unless the context clearly dictates otherwise, for example, in a wet concrete slurry, or in a cured cement material. In one embodiment, the cement used herein may include hydraulic cement, non-hydraulic cement, or a combination thereof. In a preferred embodiment, the cement comprises Portland cement, a basic ingredient of concrete, mortar, stucco, and/or non-specialty grout, which is present as a fine powder, and produced by beating limestone and clay materials in a kiln to form clinker, grinding the clinker, and adding small amounts of other materials. Several types of Portland cement are available with the most common being called ordinary Portland cement (OPC) which is grey in color. Exemplary Portland cement includes, without limitation, ordinary Portland cement (OPC) Type I, Type II, Type III, Type IV, Type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard).

In one embodiment, the cement comprises a cement blend of two or more types of cement, for example, a blend comprising Portland cement and non-Portland hydraulic cement. In a further embodiment, the cement is in the dry form. If needed to set, water is typically added after the cement is mixed with the other components or ingredients, for example, the phosphorescent strontium aluminate particles, fine aggregates (e.g. sand), and/or coarse aggregates, and it is then ready to be hardened or set.

As used herein, the term "hydraulic cement" refers to any inorganic cement that hardens, cures or sets due to hydration. Exemplary hydraulic cements include Portland cements, aluminous cements, fly ash cements, and the like. Hydraulic cements set and develop compressive strength due to the occurrence of a hydration reaction which allows them to set or cure under the presence of water. The physical properties of the set cement relate to the crystalline structure of the calcium-silicate-hydrates formed during hydration reaction. For example, conventional Portland cements form an interlocking crystalline network of, e.g. tricalcium silicate, dicalcium silicate, tetracalcium aluminum ferrite and calcium hydroxide crystals. These crystals interconnect to form an interlocking crystalline structure which provides physical strength and a degree of resiliency. Hydration products of Portland cements may also form crystalline or amorphous interlocking networks of the hydration products such as calcium silicate hydrate, calcium hydroxide (Portlandite), calcium silicate (Larnite), aluminum calcium iron oxide (e.g. $Ca_2FeAlO_5$), and/or In one or more embodiments, the hydraulic cement is present in the luminescent concrete composition at an amount of 25-65 wt %, preferably 30-60 wt %, more preferably 40-50 wt % relative to a total weight of the luminescent concrete composition. However, in some embodiments, the hydraulic cement is present in an amount of less than 25 wt % or greater than 65 wt % relative to a total weight of the luminescent concrete composition. In a preferred embodiment, the hydraulic cement is an ordinary Portland cement. In one embodiment, the hydraulic cement used herein has a specific gravity of 2-3.8, preferably 2.5-3.4, more preferably 2.9-3.2, or about 3.15.

It is equally envisaged that the present disclosure may be adapted to incorporate white Portland cement. White Portland cement or white ordinary Portland cement (WOPC) is similar to ordinary grey Portland cement in all respects except for its high degree of whiteness. The main requirement is to have low iron content which should be less than 0.5 wt % relative to the total weight of the cement expressed as $Fe_2O_3$ for white cement and less than 0.9 wt % for off-white cement. In certain embodiments, the iron oxide as ferrous oxide (FeO) obtained via slight reducing conditions (zero excess oxygen in the kiln) may give the cement a green tinge. Other metals including, but not limited to, Cr, Mn, Ti, etc. can also in trace content give color tinges to the cement of the present disclosure. In a related embodiment, the luminescent concrete composition may further comprise a pigment intended to modify the color of the composition and concrete made therefrom for aesthetic appeal.

As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers a chemical admixture used herein to provide a well-dispersed particle suspension in the wet concrete slurry. The superplasticizer may be used to prevent particle segregation and to improve the flow characteristics of the wet concrete slurry. For instance, Polycarboxylate ether-based superplasticizers are composed of a methoxy-polyethylene glycol copolymer (side chain) grafted with methacrylic acid copolymer (main chain). Polycarboxylate ether-based superplasticizers may allow a significant water reduction at a relatively low dosage, thereby providing good particle dispersion in the wet concrete slurry. Exemplary superplasticizers include, but are not limited to, a polycarboxylate, e.g. a polycarboxylate derivative with polyethylene oxide side chains, a polycarboxylate ether (PCE) superplasticizer, such as the commercially available Glenium 51®, alkyl citrates, sulfonated naphthalene, sulfonated alene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarhoxylate derivatives comprising polyethylene oxide side chains, and the like and mixtures thereof.

In some embodiments, the luminescent concrete composition described herein comprise substantially no superplasticizer, for instance, less than 0.05 wt % of superplasticizer, preferably less than 0.01 wt %, more preferably less than 0.001 wt % of superplasticizer, relative to a total weight of the luminescent concrete composition. In at least one embodiment, the luminescent concrete composition described herein is devoid of a superplasticizer. Non-limiting examples of superplasticizer that may be excluded from the luminescent concrete composition disclosed herein include sulfonated melamine, and polyethylene condensates. The exclusion of superplasticizer may lower the cost while having no deleterious effect on the physical strength of the concrete blocks resulting from the luminescent concrete composition.

In one embodiment, one or more components selected from the group consisting of limestone, metakaolins, artificial pozzolans, modified polyvinyl resins, and dispersant of vinyl acetate and ethylene copolymers are excluded from the luminescent concrete composition described herein. In another embodiment, additives including acrylic emulsions, polyethylene emulsion wax, paraffin wax, and silicone water repellents are excluded from the luminescent concrete composition described herein.

In one or more embodiments, the luminescent concrete composition of the present disclosure consists essentially of the hydraulic cement, the fine aggregate comprising sand, and the phosphorescent strontium aluminate particles. In a related embodiment, a weight ratio of the strontium aluminate particles to the fine aggregate (e.g. sand) is in the range of 1:2 to 1:20, preferably 1:3 to 1:16, preferably 1:4 to 1:12, preferably 1:5 to 1:10, preferably 1:6 to 1:9, preferably 1:7 to 1:8.

According to another aspect, the present disclosure relates to a luminescent concrete slurry comprising the luminescent concrete composition disclosed herein in any of its embodiments, and water. The water may be potable water, tap water, freshwater or seawater, and may be taken from a natural source, such as an aquifer, lake, or ocean, and may be filtered to remove large solids before using. In one or more embodiments, the water may be present in the luminescent concrete slurry in an amount of 10-25 wt % by weight of the luminescent concrete slurry, preferably 12-20 wt %, more preferably 15-18 wt % by weight of the luminescent concrete slurry. In a related embodiment, a weight ratio of the water to the hydraulic cement is in the range of 1:1 to 1:10, preferably 2:3 to 1:5, more preferably 1:2 to 1:3, or about 2:5. In general, the amount of water used in the concrete slurry depends upon the type of hydraulic cement selected and the job conditions at hand. Thus, in other embodiments, the water may be present in the luminescent concrete slurry in an amount of less than 10 wt % or greater than 25 wt % by weight of the wet concrete slurry. The amount of water used may vary over a wide range, depending upon factors such as the chemical identity of the cement and the required consistency of the luminescent concrete slurry.

According to another aspect, the present disclosure relates to a glow-in-the-dark concrete block including a surface layer containing a cured form of the luminescent concrete slurry disclosed herein in any of its embodiments, and a base concrete block. Preferably, at least a portion of a surface of the base concrete block is coated by the surface layer.

In one embodiment, the base concrete block comprises a cured form of a concrete slurry comprising cement, a fine aggregate comprising sand, a coarse aggregate comprising limestone, and water, and which is devoid of phosphorescent strontium aluminate particles.

In one or more embodiments, the concrete slurry used herein for preparing the base concrete block comprises the fine aggregate having similar properties (e.g. particle size, bulk specific gravity, water absorption) as described previously. The concrete slurry may have a weight percentage of the fine aggregate ranging from 20-40 wt % relative to a total weight of the concrete slurry, preferably 25-35 wt %, more preferably 28-32 wt % relative to the total weight of the concrete slurry. Preferably, the fine aggregate present in the concrete slurry is sand, more preferably desert sand. In one or more embodiments, the concrete slurry comprises a cement sharing similar properties (e.g. cement type, chemical composition) with the one used in the luminescent concrete composition of the first aspect. The concrete slurry may have a weight percentage of the cement ranging from 25-45 wt % relative to a total weight of the concrete slurry, preferably 28-40 wt %, more preferably 30-35 wt % relative to the total weight of the concrete slurry. Preferably, the cement is an ordinary Portland cement. Furthermore, the concrete slurry may have a weight percentage of water ranging from 8-25 wt % relative to a total weight of the concrete slurry, preferably 10-20 wt %, more preferably 12-15 wt % relative to the total weight of the concrete slurry.

In one or more embodiments, the concrete slurry for the base concrete block comprises a coarse aggregate. In one embodiment, the coarse aggregate has an average particle size in a range of 2-15 mm, preferably 3-10 mm, preferably 4-9 mm, preferably 5-8 mm. In a preferred embodiment, the coarse aggregate used herein has a specific gravity of 2.0-3.0, preferably 2.1-2.8, preferably 2.2-2.6, preferably 2.3-2.5, or about 2.4. In a preferred embodiment, the concrete slurry comprises a coarse aggregate having a water absorption of 0.5-4.0%, preferably 1.0-3.0%, preferably 1.5-2.5%, or about 2.0%. In a preferred embodiment, the concrete slurry has a weight percentage of the coarse aggregate ranging from 28-45% relative to the total weight of the composition, preferably 30-42%, preferably 32-40%, preferably 35-38% relative to the total weight of the concrete slurry.

As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. In one or more embodiment, the concrete slurry for the base concrete block comprises limestone as the coarse aggregate.

In one or more embodiments, the concrete slurry for the base concrete block comprises substantially no phosphorescent strontium aluminate particles, for instance, less than 0.1 wt % of phosphorescent strontium aluminate particles, preferably less than 0.05 wt %, more preferably less than 0.01 wt % of phosphorescent strontium aluminate particles, relative to a total weight of the concrete slurry. In at least one embodiment, the concrete slurry described herein is devoid of phosphorescent strontium aluminate particles.

Concrete production is the process of mixing together the various ingredients (water, aggregate, cement, additives, etc.) to produce concrete. Concrete production is time sensitive. Thorough mixing is advantageous for the production of uniform high quality concrete. Each section of the glow-in-the-dark concrete block described herein (e.g. the base concrete block, the surface layer) may be prepared by sequentially pouring different components into a concrete mixer (e.g. a paddle mixer, a drum mixer, a rotating mixer). For example, the aforementioned luminescent concrete composition including the phosphorescent strontium aluminate particles, the fine aggregate, and the cement, and the base concrete including the fine and coarse aggregates and the cement are each dry-mixed in concrete mixers for a time period ranging from 30 seconds-30 minutes, 60 seconds-20 minutes, or 5-10 minutes. Preferably, mixing the aggregates, the cement, and other necessary components (e.g. phosphorescent strontium aluminate particles) forms a homogeneous dry mixture. Following the dry mixing process, water is added to the dry mixture to form a wet concrete slurry. The water is slowly poured into the concrete mixer while the concrete mixer turns the dry mixture for a time period ranging from 1-10 minutes, 2-8 minutes, or 3-6 minutes thereby forming a concrete slurry (e.g. the luminescent concrete slurry, the concrete slurry for the base concrete block). Preferably, the water is mixed into the dry mixture for a time period of about 1-10 minutes, 2-8 minutes, or 3-6 minutes.

As used herein, casting refers to the process in which a fluid material (i.e. the wet concrete slurry) is poured into a mold, which contains a hollow cavity of a desired shape, and then allowed to solidify. The solidified part is also known as a casting, which is ejected, demolded or broken out of the mold to complete the process. Concrete is prepared as a viscous fluid so that it may be poured into forms to give the concrete its desired shape.

The concrete slurry may be compacted in the mold by using a hydraulic press, a vibrating table, a steel rod or a trowel. Preferably, a hydraulic press is used for compacting. In one embodiment, the concrete slurry may be poured into the bottom of a mold thereby forming a casted wet base concrete. The luminescent concrete slurry may be placed on top of the casted wet base concrete to form a casted luminescent surface layer. Alternatively, the luminescent concrete slurry may be poured into the bottom of the mold to form a casted luminescent surface layer. The concrete slurry may be placed on top of the casted luminescent surface layer thereby forming a casted wet base concrete. Preferably, a single casted article is formed when the casted luminescent surface layer and the casted wet base concrete merge at the boundary between the two. The single casted article thus contains two distinct and contiguous layers including the casted luminescent surface layer and the casted wet base concrete. The aforementioned casting may be performed at a temperature of 10-40° C., preferably 15-35° C., more preferably 23-27° C. In one embodiment, the single casted article may be cured for a time period of 2-48 hours, 6-36 hours, or 12-24 hours and then removed from the mold, which results in a glow-in-the-dark concrete block. Preferably, the junction between cured forms of the casted luminescent surface layer and the casted wet base concrete is substantially undetectable as the two are cured concurrently.

In one embodiment, the glow-in-the-dark concrete block comprises partially stratified layers whereby the casted luminescent surface layer does not form a distinct boundary with the casted base layer. For example, the casted luminescent surface layer may diffuse or partially diffuse into the casted base layer, and the boundary between the two becomes a heterogeneous phase comprising components from both layers. The diffusion phenomenon may occur when layering the luminescent surface layer on top of the base layer during aforementioned process of producing and curing of the glow-in-the-dark concrete block.

The glow-in-the-dark concrete block may be left to further cure for a length of time necessary to achieve a desired mechanical property, such as a desired compressive strength. Preferably the glow-in-the-dark concrete block, left to cure, will harden with a mechanical strength (e.g. compressive or tensile strength) that increases over the curing time. However, a strength will reach a maximum value within a certain time of curing, for example, within 28 days. In one embodiment, the glow-in-the-dark concrete block may be left to further cure for a time period of 1-30 days, preferably 5-26 days, more preferably 14-21 days, though in certain embodiments, the high performance concrete may be considered cured in less than 1 day or after 30 days. The glow-in-the-dark concrete block may be further cured at a temperature of 10-40° C., 15-35° C. or 20-28° C. Methods of preparing and curing wet concrete slurries are generally known to those skilled in the art. During the hydration and hardening period, the glow-in-the-dark concrete block may be kept under controlled temperature and humid atmosphere.

Figure 3A:
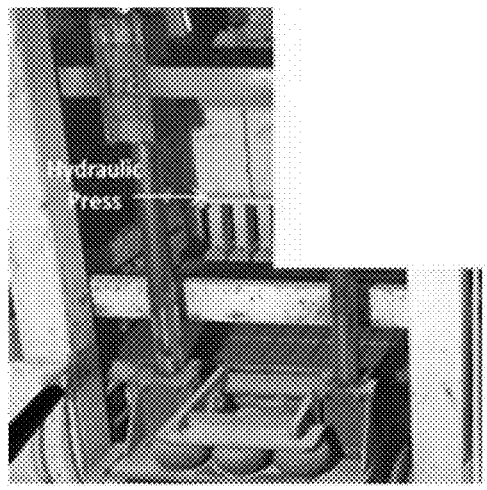
FIG. 3A is a picture showing the hydraulic press used for preparing GiD concrete blocks.

The cured form of the casted wet base concrete becomes the base concrete block, while the cured form of the casted luminescent surface layer becomes the surface layer of the glow-in-the-dark concrete block (see FIGS. 3A, B and C). In one embodiment, the surface layer of the glow-in-the-dark concrete block has a thickness of 1-20 mm, preferably 2-10 mm, more preferably 4-6 mm, or about 5 mm. In a preferred embodiment, a thickness ratio of the surface layer to the base concrete block is in the range of 1:2 to 1:60, preferably 1:5 to 1:40, preferably 1:10 to 1:30, preferably 1:12 to 1:25, preferably 1:14 to 1:20, preferably 1:15 to 1:18, or about 1:16. In one or more embodiments, a volume of the base concrete block is greater than that of the surface layer. Preferably, the volume of the base concrete block is greater than that of the surface layer by 200-2,000%, 400-1,500%, 500-1,200%, or 800-1,000%.

The glow-in-the-dark concrete block of the present disclosure may be of any shape desired including, but not limited to, a rectilinear shape, a triangular prism, a rectangular cuboid, a pentagonal prism, a hexagonal prism, an octagonal prism, a conical, a pyramid, and a cylinder. In a preferred embodiment, the glow-in-the-dark concrete block is of rectangular cuboid shape having a length in a range of 50-800 mm, preferably 100-600 mm, preferably 125-400 mm, preferably 150-300 mm, or about 200 mm a width in a range of 25-400 mm, preferably 50-300 mm, preferably 60-200 mm, preferably 70-150 mm, or about 100 mm, and a height in a range of 15-300 mm, preferably 30-250 mm, preferably 40-200 mm, preferably 50-150 mm, preferably 60-100 mm, or about 80 mm. In one or more embodiments, a portion of a surface of the base concrete block is coated by the surface layer. In one embodiment, the surface layer, which is luminescent, may be located on 1 side of the glow-in-the-dark concrete block, up to 2 sides, up to 4 sides, or up to 5 sides of the concrete block. Preferably, the sides on which the surface layer is located may be those visible and exposed to external environment (e.g. sun light).

The glow-in-the-dark concrete blocks may be produced with hollow centers (cores) to reduce weight or improve insulation. The glow-in-the-dark concrete blocks may adopt a variety of specialized shapes to allow special construction features. U-shaped blocks or knockout blocks may have notches to allow the construction of bond beams or lintel assemblies. Blocks with a channel on the end or "jamb blocks" allow doors to be secured to wall assemblies. Blocks with grooved ends permit the construction of control joints allowing a filler to be anchored between the block ends.

Other features such as "bullnoses" may be incorporated. A wide variety of decorative profiles also exist.

Because of the presence of the phosphorescent strontium aluminate particles, the glow-in-the-dark concrete block disclosed herein will luminesce after charging with electromagnetic radiation (e.g. sun light). Furthermore, such luminescence will persist after the radiation source has been removed or ceased. Importantly, the glow-in-the-dark concrete block concrete block appears to be a standard block article when viewed in daylight, while remains visible at night under poor lighting conditions (see FIGS. 4A and B). In one or more embodiments, the glow-in-the-dark concrete block disclosed herein in any of its embodiments has an intensity of glow of 2-15 candelas per square meter ($cd/m^2$), preferably 4-10 $cd/m^2$, more preferably 6-8 $cd/m^2$ for a period of 0.1-20 hours, 1-15 hours, 2-10 hours, or 4-8 hours upon excitation with sun light. The intensity of glow of a material may be examined by conventional techniques known to those skilled in the art, for example, by using a photometer to count the number of photons emitted by the material as a function of time.

As used herein, the sun light may be natural solar light or simulated solar light. Other light sources that may be used in addition to, or in lieu of the sun light include, but are not limited to, UV light, laser light, incandescent light, and the like. Exemplary light sources include, but are not limited to, a xenon lamp such as a xenon arc lamp and a xenon flash lamp, a mercurial lamp, a metal halide lamp, an LED lamp, a solar simulator, and a halogen lamp. In certain embodiments, two or more light sources may be used. In a preferred embodiment, natural sunlight may be used as the light source. In another preferred embodiment, a simulated solar light may be used as the light source. The light source used to excite the glow-in-the-dark concrete block may have an intensity of 25-500 watts, 50-300 watts, 100-200 watts, or about 150 watts at a position 5-100 cm, 10-75 cm, or 20-50 cm away from the closest surface of the concrete block. In one or more embodiments, the duration of excitation ranges from 2-30 minutes, preferably 5-20 minutes, more preferably 10-15 minutes.

As defined herein, compressive strength is the capacity of a material or structure to withstand compressive loads, as opposed to tensile strength, which is the capacity of a material or structure to withstand tensile loads. In one or more embodiments, the glow-in-the-dark concrete block has a compressive strength of 40-60 MPa, preferably 43-50 MPa, more preferably 45-48 MPa. In one embodiment, the compressive strength of the glow-in-the-dark concrete block is determined by ASTM C936/C936M. In at least one embodiment, the compressive strength is determined after further curing the glow-in-the-dark concrete block for 5-30 days, 10-29 days, or 28 days.

As used herein, skid resistance refers to the friction force between a rubber tire and a road surface. An inadequate skid resistance may lead to a higher risk of skid related accidents. In one or more embodiments, the surface layer of the glow-in-the-dark concrete block has a skid resistance value of 100-150, preferably 105-140, preferably 110-135, preferably 115-130, preferably 120-125. In one embodiment, the skid resistance reported herein is tested on a wet surface layer of the glow-in-the-dark concrete block. In another embodiment, the skid resistance reported herein is tested on a sandy surface layer of the glow-in-the-dark concrete block. The standard skid resistance value required for difficult road conditions including sandy and/or wet road surface is about 65.

The glow-in-the-dark concrete blocks of the present disclosure may be used in a variety of areas ranging from pedestrian crossing, bicycle lanes, concrete barriers, curbstones, bollards for aesthetic effect and/or safety considerations. The glow-in-the-dark concrete blocks may be advantageously used to display information by proper assembling the blocks in certain desirable shapes (e.g. a line, an arrow, a text, a logo) in circumstances of varying light. As a result of their chemical stability and low degree of leaching (see Examples 8 and 9), the glow-in-the-dark concrete blocks cause no deleterious effect on users or the environment.

A further aspect of the present disclosure relates to a luminescent concrete material including a cured form of the luminescent concrete slurry disclosed herein in any of its embodiments. The curing for the luminescent concrete material may be similar to the aforementioned procedures and conditions. The luminescent concrete material may be used in concrete restoration, pavement decoration, wall plaster, swimming pool plaster, tile setting materials such as mortars and grouts.

The examples below are intended to further illustrate methods and protocols for preparing, characterizing and assessing the luminescent concrete composition of the present disclosure, and are not intended to limit the scope of the claims.

EXAMPLE 1

Overview

Figure 2A:
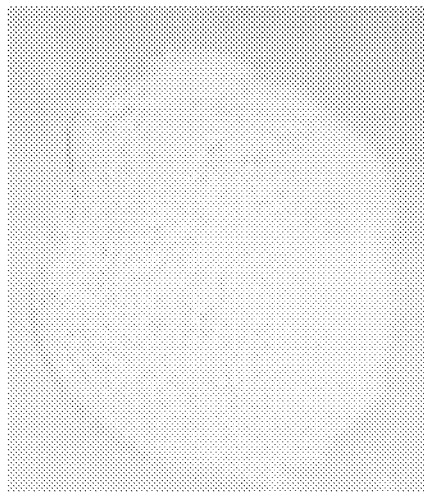
FIG. 2A is a picture showing phosphorescent strontium aluminate particles before photo-activation.
Figure 2B:
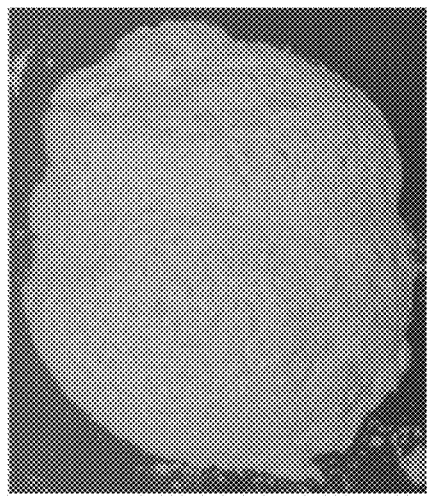
FIG. 2B is a picture showing phosphorescent strontium aluminate particles after photo-activation.

The current disclosure involves the use of strontium aluminate, a GiD powder (FIGS. 2A and 2B) in concrete for the development and testing of new interlock blocks that can be applied on infrastructure projects. Furthermore, environmental testing of the newly developed GiD amended concrete was conducted to estimate impacts on the human health and surrounding environment. The objectives of the present disclosure include:
(i) describing suitable proportions of GiD material and other concrete ingredients to achieve desirable glow intensity, duration and strength;
(ii) conducting mechanical testing of the developed specimen to assess real-world feasibility of the GiD concrete; and
(iii) performing environmental testing of the developed specimen to analyze real-world environmental impact of the GiD concrete.

EXAMPLE 2

Materials

Figure 3B:
FIG. 3B is a picture showing GiD concrete blocks.
Figure 3C:
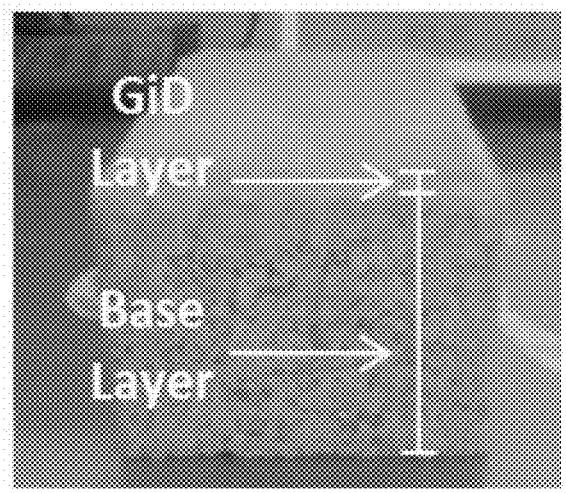
FIG. 3C is a picture showing a close-up view of a GiD concrete block.

A total of 54 concrete interlock blocks were casted using ordinary Portland grey cement with specific gravity of 3.15. Each interlock block comprises two portions: the top surface layer and the bottom base layer. The bottom layer of the block contained a cement, fine and course aggregates, as the bottom layer was the main load bearing portion. The top layer was smooth finished and mainly contained cement and a fine aggregate, as shown in FIGS. 3A, 3B and 3C. The dimension of the interlock block was 200×100×80 mm.

The chemical composition of the ordinary Portland cement (OPC) by weight (%) was as follows: CaO=64.3, $SiO_2$=22, $Al_2O_3$=5.64, $Fe_2O_3$=3.8, $K_2O$=0.36, MgO=2.11, $Na_2O$=0.19 and equivalent alkalis ($Na_2O+0.665K_2O$)=0.42, loss on ignition was 0.7, $C_3S$=55, $C_2S$=19, $C_3A$=10 and $C_4AF$=7.

Desert sand possessing a bulk specific gravity of 2.66 and water absorption of 0.60%, respectively, was used as the fine aggregate. The water-to-cement ratio was 0.41 and the weight concentration of the fine aggregate is 55% relative to the dry composition.

The base layer included limestone as the course aggregate. The limestone had a maximum size of 10 mm was and was graded in accordance with ASTM C33. In addition, ASTM C33 conditions for coarse aggregate grading were satisfied by selecting aggregate size of 10 and 4.75 mm partitioned 20% and 80% by mass respectively. The limestone had a bulk specific gravity of 2.41 and water absorption of 2.03%, respectively.

A typical mixing process began by weighing the cement, sand, and GiD powder using a weighing scale with accuracy of the nearest thousandth. Firstly, the GiD powder and sand were hand mixed using a mixer and then the cement was added along with water content. GiD powder was used in three different proportions, i.e. 10%, 15% and 20% replacement of sand to investigate the effect of the addition of GiD powder on the strength, intensity of glow, and glow duration of the interlock block.

Figure 4A:
FIG. 4A is a picture showing GiD concrete blocks seen in daylight.
Figure 4B:
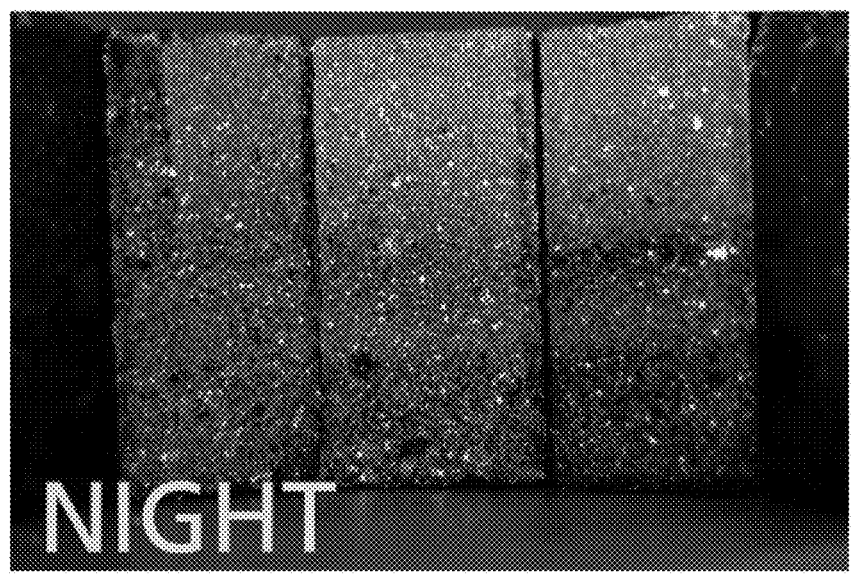
FIG. 4B is a picture showing the GiD concrete blocks of FIG. 4A seen at night.

The entire mix was then place in the hydraulic press and only the top 5 mm layer of the interlock block was cast-in-place as shown in FIG. 3A. The rationale behind using GiD concrete material only as the top layer of the interlock block was that the bottom part of the tile would be embedded underneath the ground surface, and the light would not be able to reach the GiD material. As a result, any addition of GiD into the bottom layer would result in a cost increase without any added benefit. Andrew et al. [Andrew, A., Taylor, W., Tao, B. and Weiss, J. (2015): "Assessing the Performance of Glow in the Dark Concrete", *Transportation Research Record: Journal of the Transportation Research Board*, 41, pp. 1-14. DOI: 10.3141/2508-04, incorporated herein by reference in its entirety] developed a GiD liquid sealant via mixing GiD powder with soy methyl ester polystyrene. From the experimentation the researchers found that a GiD layer with a thickness beyond 3 mm had a negligible effect on the glow intensity and duration. However, the GiD sealant produced by the past researchers had little to no durability thus could not be applied in a harsh, real-world enviromnent. Furthermore, the researchers did not shed any light on the impact of using GiD material on the environment. FIGS. 4A and 4B depict the glow-in-the-dark (GiD) interlock block samples in the day light and night light setting, respectively. The samples showed the ability to absorb energy during the day time and release the stored energy as visible light during the night time. In order to reduce cost of production, only the top 5 mm layer of the interlock tiles was replaced with the GiD amended concrete.

Durability and environmental impact assessments were conducted on the GiD interlock block samples in order to ascertain their readiness for real-world application. The objective of the testing was to provide scientific data related to the mechanical properties of the newly developed GiD interlock blocks and also to determine the effects of GiD material on human health and the environment. Furthermore, a detailed cost analysis of the samples was conducted and compared to the cost of existing regular concrete block samples. This helped determination of suitability of the GiD interlock blocks in-terms of real world application. The proceeding sections detail the results of these assessments.

EXAMPLE 3

Compressive Strength Testing

ASTM C936/C936M was adopted for all the testing conducted on concrete paving units. 54 block samples were casted with a 200×100×80 mm dimension and a thickness/width aspect ratio of 0.8. All the samples were air dried for 24 hours in a humidity controlled room at 90% humidity level. The samples were then placed in a temperature controlled curing tank at a temperature between 22-24° C. for 28 days. Three regular block samples without any material modification were tested under compressive loading as control samples. The control samples had an average strength of 49.47 MPa. Nine GiD modified samples, including three each with 10%, 15%, and 20% replacement of sand with the GiD powder were tested under compressive loading. As shown in Table 1, these GiD modified samples had an average compressive strength of 45.48 MPa.

Figure 5A:
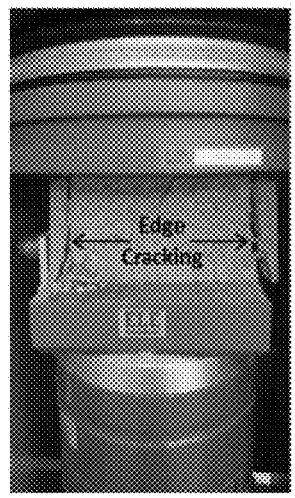
FIG. 5A is a picture showing a cracking pattern of a GiD concrete block sample 1.
Figure 5B:
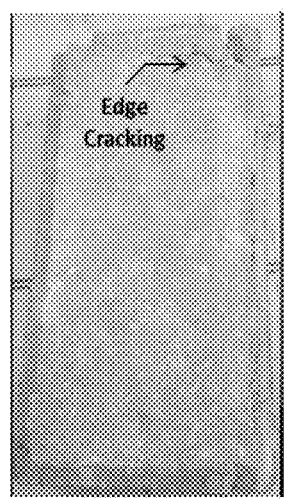
FIG. 5B is a picture showing a cracking pattern of a GiD concrete block sample 2.
Figure 5C:
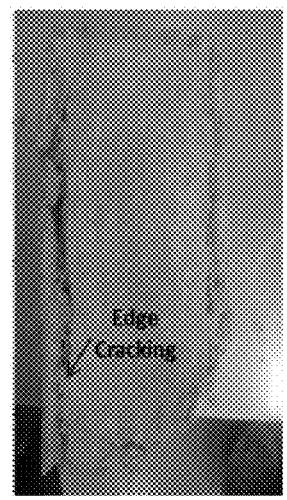
FIG. 5C is a picture showing a cracking pattern of a GiD concrete block sample 3.

From the results, it is evident that an increase in the content of GiD powder had a negligible effect on the compressive strength since the difference between samples having different GiD contents was below 5%. However, the GiD amended samples reported a 8.1% lower strength on average as compared to regular samples. This loss in compressive strength could be attributed to the reduced compressive force applied on the GiD samples during the manufacturing process. Since only the top layer of the interlock block was replaced, the production line was stopped after the base layer was cast during regular manufacturing process, the GiD top layer was then manually placed in the block molds, and lastly the hydraulic pressure was applied. Such interruption and resumption of the hydraulic press resulted in reduced pressure application on the new GiD samples, hence led to the reduced compressive strength. Additionally, it should be noted that the samples will be embedded in the ground and surrounded by other interlock blocks in real-world conditions, thus the load carrying capacity would increase owing to confinement provided by adjacent blocks. FIGS. 5A, 5B and 5C present typical cracking patterns of the tested samples. From the experimentation, it was observed that the samples tended to fail owing to cracks on the edges.

In addition, compression strength testing was performed on samples after they were subjected to thermal loading. The rationale behind conducting compressive strength testing after the application of thermal cycling was to simulate real-world behavior after application of the GiD blocks on pavements. Six samples, two of each proportioning, were tested after being subjected to thermal cyclic loading. The average compressive strength was 43.79 MPa, which was approximately 4% lower than regular GiD samples. This slight loss in strength can be attributed to the evaporation of water molecules from the pores of the GiD interlock block samples, which resulted in a pours sample hence led to a loss in compressive strength. Importantly, no difference in the strength was observed by varying the percentage of GiD powder in the concrete. This could be reasoned by the fact that only the top 5 mm layer was emended with GiD powder, and the top layer was not the load bearing portion of the interlock block, thus the effect GiD powder on overall strength of the block was negligible. The details of the thermal testing are provided in the proceeding section.

TABLE 1

Compressive strength testing of control and GiD blocks

| Sr. No. | Area (mm$^2$) | Load (N) | Comp. Str. (MPa) |
|---|---|---|---|
| CONTROL | | | |
| 1 | 20000 | 985200 | 49.26 |
| 2 | 20000 | 997400 | 49.87 |
| 3 | 20000 | 985400 | 49.27 |
| | Average | | 49.47 |
| GiD SAMPLES | | | |
| 1 | 20000 | 945170 | 47.2585 |
| 2 | 20000 | 907240 | 45.362 |
| 3 | 20000 | 917440 | 45.872 |
| 4 | 20000 | 865300 | 43.265 |
| 5 | 20000 | 906700 | 45.335 |
| 6 | 20000 | 917000 | 45.85 |
| 7 | 20000 | 904800 | 45.24 |
| 8 | 20000 | 918700 | 45.935 |
| 9 | 20000 | 905100 | 45.255 |
| | Average | | 45.48 |

EXAMPLE 4

Thermal Testing

Thermal cyclic testing of the developed GiD concrete samples was conducted to evaluate the suitability of application of these samples in real-world conditions. Since in real-world the samples will be exposed to harsh environmental conditions where cyclic thermal loadings may occur, the objective of this testing was to analyze the effect of thermal loading on GiD material. Fundamentally, the testing was to check if melting or expansion of GiD emended material would occur when exposed to increased temperature. In this regard, two types of thermal loading test were designed. The first test was designed to simulate the daily cyclic thermal loading induced owing to sunlight. For this purpose three samples were left to cool off for 24 hours in a temperature controlled laboratory at 26° C., afterwards the samples were placed in an oven and the temperature was increased to 60° C. with a 5° C. increase rate per minute. The samples were kept at 60° C. for 30 mins and then cooled back to room temperature. 15 cycles of this thermal loading were applied on each sample. From the experimentation, it was observed that samples did not demonstrate any thermal stress, material melting, delamination, or deformation. For the second type of thermal loading, three samples were left to cool off at 26° C. for 24 hours, later these samples were placed in the oven and temperature was increased to 160° C. at a 5° C. increase rate per minute. The samples were held at 160° C. for 15 mins. This test was designed to simulate the extreme condition when placement of hot bitumen on the road surface occurs adjacent to GiD interlock blocks. From the experimentation, no damage to the samples was observed. This showed that the prepared GiD samples could be applied in real-world situations.

EXAMPLE 5

Skid Resistance Testing

Since the application of the GiD samples presented in the current disclosure is for bicycle ways, pedestrian crossings, walk ways, etc., it was necessary to evaluate the skid resistance of the developed samples under varying weather conditions. For this purpose, skid resistance test was performed under air dry conditions, saturated surface conditions, as well as sandy conditions. The skid resistance test represented the frictional resistance property of the prototype. The standard requirement of skid resistance value (SRV) for most difficult sites is 65. Table 2 presents the SRV for dry, wet and sandy conditions. From the results, it is evident that the developed prototype is suitable for any weather condition.

TABLE 2

Skid resistance value

| Sr. No. | Sample Size (mm) | Surface Condition | Skid Average |
|---|---|---|---|
| 1 | 200 × 100 × 80 | Wet | 135 |
| 2 | 200 × 100 × 80 | Dry | 120 |
| 3 | 200 × 100 × 80 | Sandy | 105 |

EXAMPLE 6

Particle Size Analysis

Figure 6:
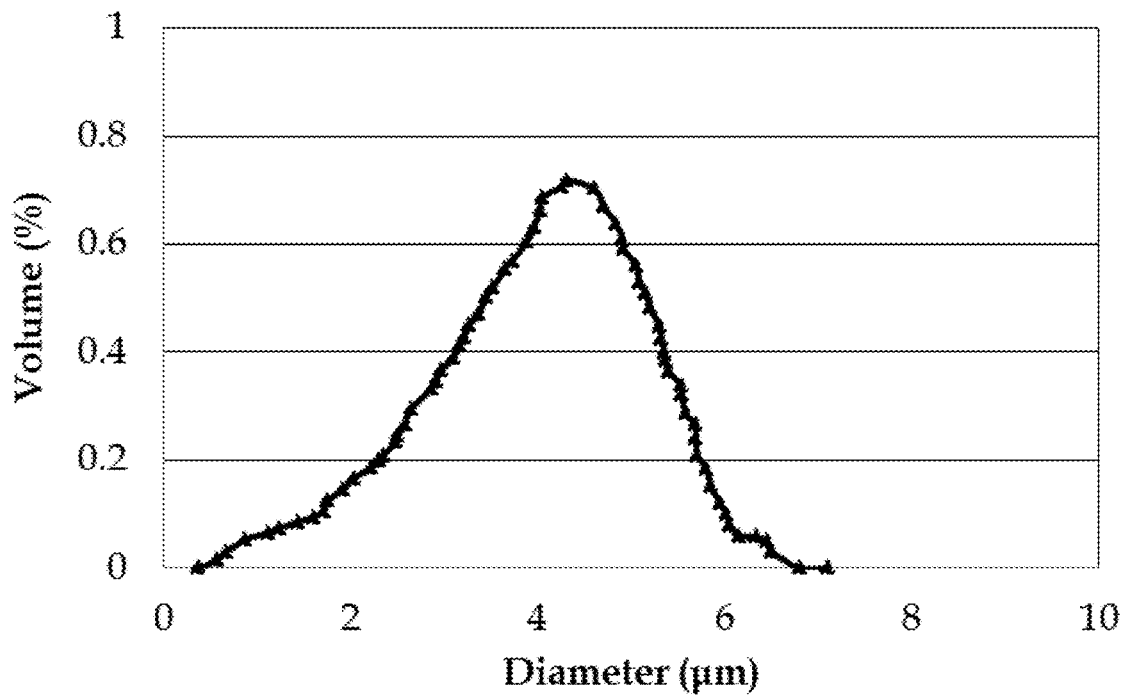
FIG. 6 is a particle size distribution curve of phosphorescent strontiwn aluminate particles.

As shown in FIG. 6, particle size analysis was conducted on the GiD powder. The GiD powder size distribution showed a $D_{50}$ at 4.05 μm and a $D_{90}$ at 5.5 μm. Such particle size distribution was suitable for the utilization of the powder on the top layer of the interlock blocks. Furthermore, this particle size distribution has an added advantage that the mortar prepared using this GiD luminance powder can be applied to concrete barriers and curbstones for added visibility and safety. In addition, GiD based disks that can be used as lane separators on road surfaces may be prepared by dissolving GiD powder in bio-degradable non-toxic solvent and casting the samples. However, this is subjected to future research and development.

EXAMPLE 7

Luminance Testing

Streetlights consume approximately 2.3% of the global electricity energy [Kostic, M., and L. Djokic, L. (2009): "Recommendations for energy efficient and visually acceptable street lighting". Energy, 34 (10), pp. 1565-1572, incorporated herein by reference in its entirety]. GiD materials may provide an energy efficient alternative to the increasing demand of electricity. The developed prototype may be applied on bicycle ways, walkways, along with other applications to improve road safety and esthetic appeal, while at the same time lower the energy consumption. Using GiD material in the form of emulsion or sealant has drawbacks such as lack of durability [Andrew, A., Taylor, W., Tao, B. and Weiss, J. (2015): "Assessing the Performance of Glow in the Dark Concrete", Transportation Research Record: Journal of the Transportation Research Board, 41, pp. 1-14. DOI: 10.3141/2508-04, incorporated herein by reference in its entirety]. Depending on the traffic conditions, it was estimated that road traffic can erode paint coating applied on road within a period of 0.7-2.5 years. It is evident that embedding the GiD material into the concrete surface is a suitable application. In this regard luminance testing was conducted on the developed prototype to judge the feasibility.

A light measuring photometer was used to analyze the intensity and duration of light emitted in candelas per square meter (cd/m$^2$). Before the commencement of luminance test, the base reading of the GiD interlock block sample was established by placing the sample in a dark box for 24 hours to eradicate any excitation from external light source. The base reading was recorded at a level where the human eye could not discern any light coming from the prototype, i.e. 0.0003 cd/m² [Matsuzawa, T., Aoki, Y., Takeuchi, N. and Murayama, Y. (1996): "A New Long Phosphorescent phosphor with high brightness", 143(5), pp. 4-7, incorporated herein by reference in its entirety]. Before measuring the glow of the samples, the samples were charged/excited using a 150 watt xenon lamp. Such choice was made because the light emitted by a xenon lamp closely matched sun light in terms of spectral wavelength. The distance between the light source and GiD prototype was adjusted so that the entire surface of the sample was covered.

Figure 7:
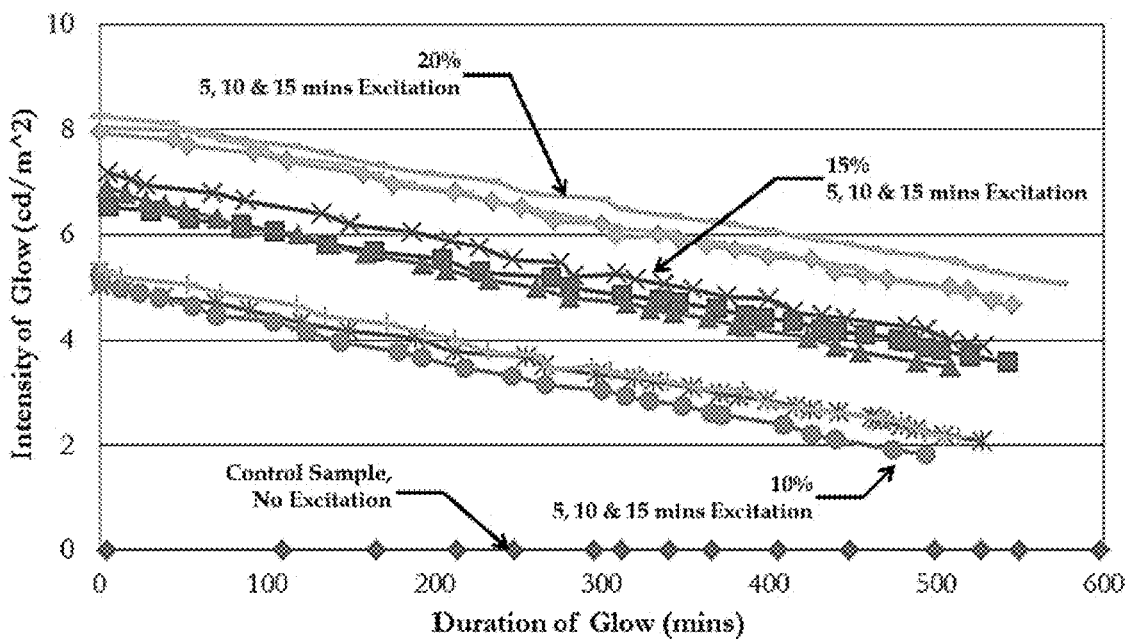
FIG. 7 shows the effect of excitation duration on the glow intensity of GiD concrete blocks having weight ratios of the strontium aluminate particles to the fine aggregate of 10:90, 15:85, and 20:80, respectively.

Three different samples i.e. 10%, 15%, and 20% addition of GiD samples were tested under three individual excitation conditions i.e. 5, 10, and 15 mins of excitation. The procedure of glow measurement experiment includes excitation of the sample for the desired time duration, then placing the photometer on top of the sample 30 seconds after the lamp was switched off, and starting the data recording. The data recording was conducted for a minimum of 9 hours (540 min). The rationale behind choosing this time length was to see if the GiD samples can glow for 9 hours without the presence of any sunlight, since the samples have a main function to glow during night time. FIG. 7 presents the result of 9 experimentation setups, 3 samples each of 10%, 15% and 20% addition of GiD powder excited for 5, 10 and 15 minutes. From the presented results it is evident that as the percentage of GiD material increases the intensity of glow increases, while the duration of excitation had little effect on the duration of glow. This can lead to the conclusion that once the GiD material is fully charged it can keep glowing for the desired amount of time. However, the intensity of glow depends upon the percentage addition of GiD material. Furthermore, from the analysis on the results presented in FIG. 7, it was observed that there was 20% increase in glow intensity by increasing the GiD content from 10% to 15%, however, only 8% increase in glow intensity was recorded for increasing the GiD content from 15% to 20%. Hence, it can be seen that the percentage gain in glow intensity reduced with increasing GiD content, whereas the cost of manufacturing would increase exponentially by increasing the GiD content. Hence, it can be concluded that 20% is a desired percentage of GiD material for achieving sufficient glow and reasonable cost. The cost analysis and environmental impact assessment of the developed prototype is presented in the proceeding section.

EXAMPLE 8

Environmental Risk Assessment

Figure 8:
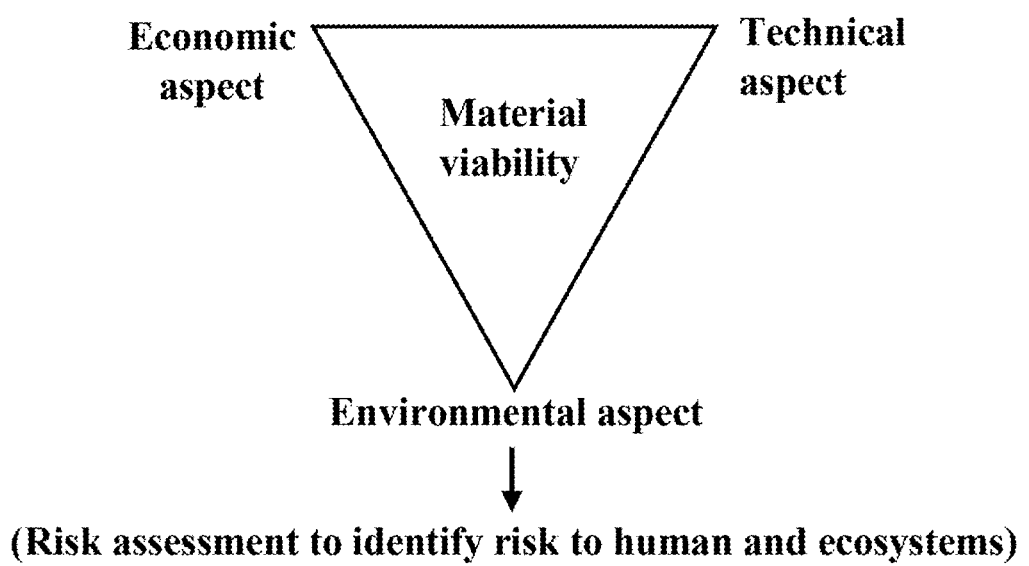
FIG. 8 is a material feasibility triangle diagram.

Over the last few years, there is a significant rise in the assessment of environmental compatibility of construction materials [Victoria, E. (1995): "Environmental Guidelines for Major Construction Sites", incorporated herein by reference in its entirety]. Concrete structures constructed using these materials experience long term exposure with soil, ground water, and drinking water. The approval of utilization of certain materials in buildings or concrete structures is not only based on technical or economic aspects but is also greatly influenced by its environmental impact [Collivignarelli, C., Sorlini. S. (2002): "Reuse of municipal solid wastes incineration fly ashes in concrete mixtures", Waste Management, 22, 909-912, incorporated herein by reference in its entirety]. FIG. 8 depicts the material feasibility triangle. For a material to be viable for use in the construction industry, its technical, economic and environmental impacts need to be evaluated. Concrete structure may contain small quantities of trace elements via raw materials. The concentration of trace elements in concrete structure is an important aspect for the environmental risk assessment. For example, by regulation the trace element concentration in German cement should be within a similar order as in natural rock, soil and clay regardless of whether additives are used. Numerous investigations confirmed that most trace elements such as cadmium, chromium, arsenic, antimony etc., were found in insoluble forms in mortars and concretes and were released into the soil in tiny quantities. This indicates that the construction material must comply with obligatory requirements which include stability, fitness for use, durability, and essential protection for hygiene, health and the environment. Therefore, in order to evaluate the environment compatibility of GiD powder and GiD amended concrete, chemical and elemental composition analyses were performed. The results of such testing are provided in the proceeding section.

(i) Risk Assessment Threshold of GiD Amended Concrete

The risk evaluation of a material can be determined by considering its potential toxicity and exposure routes. These are the key tools to identify risks posed by contaminants in material and evaluate the environmental feasibility and impact on human health of the material. The toxicity of the material may depend on the presence of trace elements. The material can be classified as acute or highly lethal based on the concentration of toxic chemical. Toxicity criteria are categorized in humans and ecosystems. For humans, it can be classified as cancerous and noncancerous impacts, and for environment it is associated to pollution and community level impact. Toxicity analysis includes chemical and elemental composition, and leaching analyses. The main objective of analyzing the toxicity is to compare the concentration of elements in GiD amended concrete with regulatory standards such as soil cleanup level at residential and commercial scale and Safe Drinking Water Act (SDWA) for primary drinking water as stipulated by United States Environmental Protection Agency (US EPA). Table 3 and 4 show a list of concentration limit of elements in drinking water and soil cleanup levels, respectively. The quantification of toxicity and comparison to regulation standard values provide information to an effective control of the level of contaminant effecting human health and environment. The degree of toxicity depends on the level of contamination and its duration. It is not only related to the toxicity of the material, but also dependent on how the material is exposed or comes into contact with organisms. Therefore, the degree of toxicity is associated with the level of exposure. The possible exposure routes for the present analysis were (i) ingestion which affects organs (liver, nervous, kidneys) and cancerous impact, (ii) inhalation associated with exposure due to contaminated air, and (iii) dermal exposure due to skin contact with contaminated soil.

TABLE 3

Maximum concentration limit (MCL) of national primary drinking water regulations

| Contaminant Name | TC Limit (mg/L) | SDWA MCL (mg/L) |
|---|---|---|
| Arsenic | 5.0 | 0.01 |
| Barium | 100.0 | 2 |
| Cadmium | 1.0 | 0.005 |
| Chromium | 5.0 | 0.1 |
| Mercury | 0.2 | 0.002 |
| Lead | 5.0 | 0.015 |
| Silver | 5.0 | 0.10 |

SDWA: Safe Drinking Water Act 1974, United States Environmental Protection Agency (USEPA)

TABLE 4

Soil cleanup target level of some contaminants

| Contaminant | Direct exposure | |
| --- | --- | --- |
| Name | Residential (mg/kg) | Commercial (mg/kg) |
| Nitrate | 5.0 | — |
| Sulfate | 100.0 | 7600 |
| Lead | 1.0 | 1400 |
| Cadmium | 5.0 | 1700 |
| Mercury | 0.2 | 17 |
| Aluminum | 5.0 | — |
| Arsenic | 5.0 | 12 |

(ii) Procedure of Toxicity Analysis

About 6 grams of GiD powder and concrete was mixed with 18 mL of deionized water in a 50 mL centrifuge tube. The solution was shaken for about 15 minutes, followed by centrifugation for 30 minutes at 5500 rpm, and filtration. The filtrate was stored in a refrigerator for chemical and elemental analyses. The mobile phase was prepared by taking 12 mM $NaHCO_3$ and 0.6 mM $Na_2CO_3$ prepared by weighing 0.0636 g of $NaHCO_3$ and 1.008 g of $Na_2CO_3$ in one liter of deionized water. Shimadzu High Performance Liquid Ion Chromatography (UFLC) equipment was used to measure anions such as (chloride, nitrate, sulfate, and phosphate). Four different standard levels were prepared by dividing the molar mass of NaCl (58.5 g/mol) by the molar mass of Cl (35.5) to yield a mass of 1.65 g of $cl^-$. The second standard was prepared by dividing the molar mass of $NaNO_3$ (84 g/mol) by the molar mass of $NO_3$ which was 62 g/mol to yield a mass of 1.37 g. The third standard was prepared by dividing the molar mass of $KH_2PO_4$ (136.09 g/mol) by the molar mass of $PO_4$ (94.97 g/mol) to yield a mass of 0.14326 g of $PO_4^{-3}$. The last standard was prepared by dividing the molar mass of $Na_2SO_4$ (142 g/mol) by the molar mass of $SO_4^-$ (96 g/mol) to give up a mass of 1.48 g. The masses were dissolved in one liter of deionized water to make 1000 ppm solution, and then diluted to 1.56 ppm, 1125 ppm, 6.25 ppm, 12.5 ppm, 25 ppm, 50 ppm, 75 ppm, and 100 ppm respectively for accurate calibration. In addition, inductively coupled plasma optical emission spectrometry (ICP-OES) was used as an analytical approach to evaluate the presence of various chemical elements. ICP-OES analysis of GiD powder and GiD amended concrete was used to evaluate its chemical composition and to determine the level of various chemical elements. The results of this analysis are provided in the proceeding section.

(iii) Determination of Concentration of Anions in GiD Powder and GiD Amended Concrete and its Comparison with Soil Cleanup Target Levels Presence of anions such as chloride, phosphate, and sulfate in concrete at high concentration level can lead to corrosion of steel reinforcement. This causes the degradation of reinforced concrete strength and significantly affects the structural integrity. For this reason, the allowed concentration levels of these anions in a reinforced concrete structure are strictly controlled as they have a considerable impact on structural durability. Moreover, in regards to environmental compatibility, these anions are highly toxic and serious threat to marine life and human health when present above their acceptable concentration limit. Their existence in water often produces undesirable taste and ingestion of these anions can cause major health effect, e.g. sulfate is laxative action [Boyd, C. E., Massaut, 1 (1999): "Risks associated with the use of chemicals in pond aqua-culture", Aqua-cultural Engineering, 20, 113-132, incorporated herein by reference in its entirety], excess phosphate inhalation significantly affects both cardiovascular and musculoskeletal systems [Naus, D., Mattus. C., and Dole, L. (200): "Final Report, Assessment of Potential Phosphate Ion-cementitious Materials Interactions", US Nuclear Regulatory Commission, Office of Nuclear Regulatory Research, incorporated herein by reference in its entirety]. The concentration of these ions present in GiD powder and GiD amended concrete are listed in Table 5. The results shown in table 5 clearly confirm that the content of all four anions in both GiD powder and GiD amended concrete were below 100 mg/kg as required by US EPA. The concentration ranges in GiD powder and GiD amended concrete were found in the order of: nitrate>chloride>sulfate>phosphate. The level of anions content in GiD powder and GiD amended concrete is within acceptable range when compared to soil cleanup target levels for residential and commercial applications [Code, F.A. (2005): "Development of soil cleanup target levels (SCTLs)", incorporated herein by reference in its entirety]. Therefore, based on anions results, it appears that the application of GiD amended concrete in both residential and commercial structures is environmentally viable and poses no threat to human health.

TABLE 5

Comparison of concentration of anions in GiD powder, GiD amended concrete with SCTL

| Sample | Chloride (mg/Kg) | Nitrate (mg/Kg) | Phosphate (mg/Kg) | Sulfate (mg/Kg) |
| --- | --- | --- | --- | --- |
| GiD Powder | 40.41 | 84.51 | <1 | 7.83 |
| GiD Concrete | 18.09 | 5.87 | <1 | 8.78 |
| SCTL (residential) 2005 (DE) | 3100 | 140000 | 19 | 450 |
| SCTL (commercial) 2005 (DE) | 37000 | * | 57 | 7600 |

SCTL = Soil Cleanup Target Level

EXAMPLE 9

Figure 9:
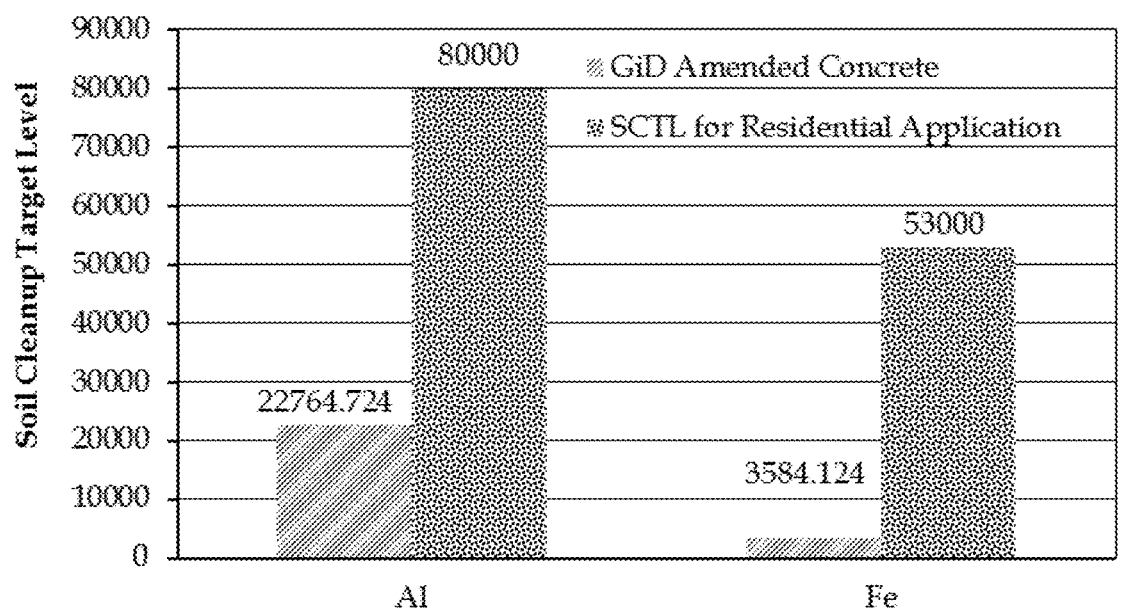
FIG. 9 is a bar graph comparing concentrations of major contaminants including Al and Fe elements in the GiD concrete block to those at soil cleanup target level (SCTL).
Figure 10:
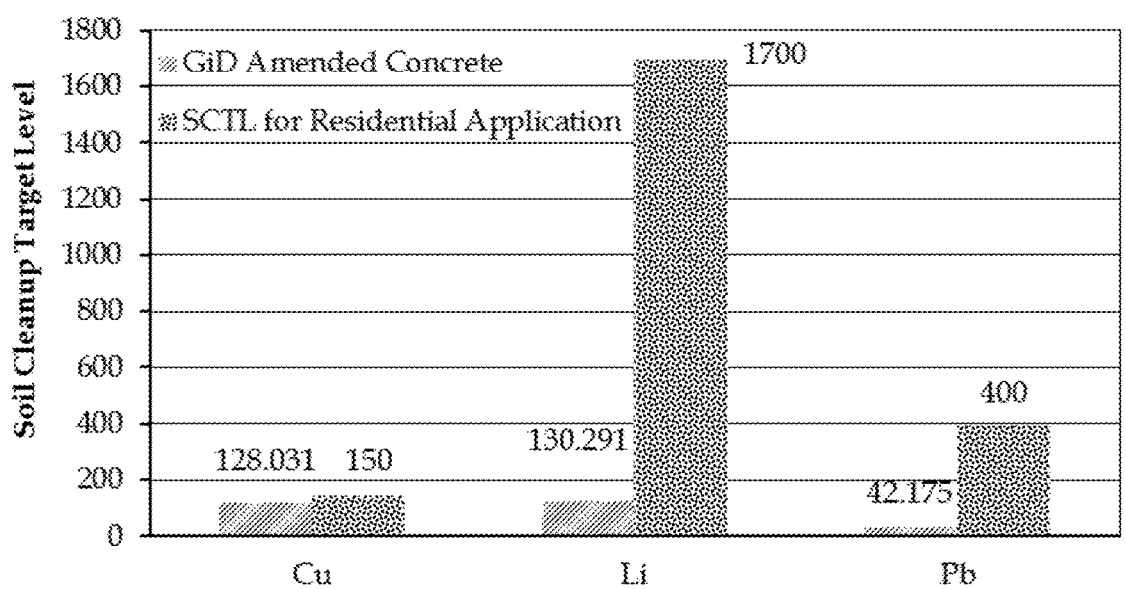
FIG. 10 is a bar graph comparing concentrations of major contaminants including Cu, Li, and Pb elements in the GiD concrete block to those at soil cleanup target level (SCTL).

Determination of elemental composition of GiD powder and GiD amended concrete and its comparison with WCTL Contamination of heavy metals in water, soil, and air is an alarming and severe issue worldwide. These heavy metals produce harmful impact on both ecosystem and human health. Therefore, it is important to elucidate the behavior of heavy metal in concrete to prevent such hazardous effects. Table 6 shows that lithium, lead, aluminum, cadmium, cobalt and copper are the main heavy metals in GiD powder with concentrations of 437.591, 379.111, 285319, 185.523, 258.118, and 1056.672 mg/kg, respectively. The concentrations of other elements including As, Cr, Fe, and Zn were found below the detection limit. Similarly, in case of GiD amended concrete, the content of trace elements appeared in the order of: Ca>Al>Na>Mg>Fe>Li>Cu>Pb. Comparing GiD trace elements content with soil cleanup target level, the concentrations of Al, Cd and Cu were observed higher than acceptable limit of residential direct exposure. However other elements were below the acceptable range. Furthermore, for GiD amended concrete, the concentration of all the elements was found to be below the acceptable range. The order of concentration of elements in GiD amended concrete was found as Ca>Al>Mg>Na>Fe>Cu>Pb. In addition, as shown in FIG. 9 and FIG. 10, the major content of contaminant present in concrete were aluminum, iron, copper, and lead. Therefore, the trace element analysis clearly confirmed that the concrete structure contained toxic contaminant concentration below the standard protective regulations regarding both human and environment.

TABLE 6

Comparison of concentration of anions in GiD powder, GiD amended concrete with WCTL

| Smp | Fe | K | Li | Mg | Na | Ni | Pb |
|---|---|---|---|---|---|---|---|
|  |  |  |  | mg/kg |  |  |  |
| 1) | <1 | 139.142 | 437.591 | 240.642 | 10.083 | 184.850 | 379.111 |
| 2) | 3584.124 | <1 | 130.291 | 4450.972 | 4540.593 | <1 | 42.175 |
| 3) | 53000 | * | 1700 | * | * | 340** | 400 |
| 4) | * | * | 44000 | * | * | 35000 | 1400 |

| Smp | Al | As | Ca | Cd | Co | Cr | Cu |
|---|---|---|---|---|---|---|---|
|  |  |  | mg/kg |  |  |  |  |
| 1) | 285319.52 | <1 | 1726.838 | 185.523 | 258.118 | <1 | 1056.672 |
| 2) | 22764.724 | <1 | 204184.36 | <1 | <1 | <1 | 128.031 |
| 3) | 80000 | 2.1 | * | 82 | 1700 | 210 | 150 |
| 4) | * | 12 | * | 1700 | 42000 | 470 | 89000 |

1) GiD Powder
2) GiD Concrete
3) WCTL (residential) 2005 (DE)
4) WCTL (commercial) 2005 (DE)
*Contaminant is not a health concern for this exposure scenario
**Direct exposure value based on acute toxicity considerations. This criterion is applicable in scenarios where children might be exposed to soils (e.g. residences, schools, playgrounds)

EXAMPLE 10

Cost Analysis Environmental Risk Assessment

The cost analysis of the developed prototype as shown in FIG. 4 was conducted to evaluate the increase in cost that occurred due to the addition of GiD material. The cost analysis was conducted using 20% GiD addition and taking into account of the real-world market prices of regular non-glowing interlock blocks. The details of the cost analysis are provided below:

Total number of 200×100×80 mm interlock blocks in 1 m² area=50

Cost of 1 m² regular non-glow interlock blocks=SR 25 (US$ 6.7)

Cost of one, 200×100×80 mm interlock block=SR 0.5 (US$ 0.133)

Cost of 20% GiD for one 200×100×80 mm interlock block=SR 3.05 (US$ 0.81)

Total cost of new one GiD interlock block=SR 3.55 (US$ 0.94)

50% replacement of GiD blocks in 1 m² area=25× 3.55=SR 88.75 (US$ 23.64)

50% cost of regular interlock blocks=25×0.5=SR 12.5 (US$ 3.33)

Total Cost of 1 m² area at 50% GiD samples=SR 101.25 (26.97)

Percentage increase in cost=102.5%

It should be noted that the above mentioned cost are related to samples prepared for laboratory testing and development. Furthermore, once the manufacturing is conducted on a larger scale, the cost of production, material and procurement can be reduced. The objective of presenting the cost analysis is to provide insight into additional cost together with increase in safety, sense of security, energy efficiency, and living condition as a result of the real-world application of the presented innovation.

EXAMPLE 11

The development, testing, and environmental impact assessment of glow-in-the-dark amended concrete is presented. GiD interlock blocks have been developed which can be applied to various infrastructure locations. From the results and discussion of the present disclosure, the following conclusions can be drawn:

(i) GiD amended interlock block samples experienced 8.1% strength drop compared to regular interlock blocks. This loss in strength could be attributed to reduced compressive force applied during manufacturing;
(ii) GiD amended interlock block samples showed good resilience against thermal cycling and performed exceptionally in skid resistance test;
(iii) luminance testing revealed that glow intensity increased with increasing GiD content, however, the duration of glow was not affected with the duration of excitation beyond 5 mins.
(iv) environmental impact assessment of GiD amended concrete revealed that the material is safe for application in real world concrete structures. Furthermore, the material can be categorized as clean material from concrete leaching aspect, as all the detected trace elements (Ca, Al, Mg, Na, Fe, Cu, Pb) were below the acceptable limits set by US-EPA for soil and water clean-up.
(v) cost analysis for 20% GiD content at 50% replacement for 1 m² interlock blocks revealed approximately 100% cost increase. This cost increase can be evaluated by comparing the advantages of the GiD amended concrete including increase in safety, and reduction in energy cost.

The findings presented herein can be used by regulatory authorities to develop regulations that govern the application of this newly developed prototype on infrastructure projects. Additionally, the cost analysis of using GiD material on the interlocking blocks used for walkways was performed to show the cost increase that would occur relative to the application of the newly developed material in real-world.

The presented work was conducted using grey cement. Cement with varying color pigments such as white, yellow, red and orange etc. can also be used.

The invention claimed is:

1. A luminescent concrete composition, consisting essentially of:
   a hydraulic cement;
   a fine aggregate comprising sand; and
   phosphorescent strontium aluminate particles having an average particle size of 2-6 μm,
   wherein:
   a weight ratio of the phosphorescent strontium aluminate particles to the fine aggregate is in the range of 10-20: 90-80;
   the luminescent concrete composition is devoid of a superplasticizer, and
   the luminescent concrete composition has an intensity of glow of from 4 to 8 cd/m² for more than 200 minutes.

2. The luminescent concrete composition of claim 1, wherein the phosphorescent strontium aluminate particles comprise a rare earth element doped strontium aluminate.

3. The luminescent concrete composition of claim 2, wherein the rare earth element is at least one selected from the group consisting of cerium, dysprosium, europium, and neodymium.

4. The luminescent concrete composition of claim 3, wherein the rare earth element doped strontium aluminate further comprises a promoter selected from the group consisting of boron, lithium, sodium, potassium, magnesium, calcium, barium, chromium, and manganese.

5. The luminescent concrete composition of claim 1, wherein the sand has a bulk specific gravity of 2.2-2.8, and a water absorption of 0.2%-1.0%.

6. The luminescent concrete composition of claim 1, which has a weight percentage of the fine aggregate ranging from 35-60 wt % relative to a total weight of the luminescent concrete composition.

7. The luminescent concrete composition of claim 1, wherein the hydraulic cement is an ordinary Portland cement.

8. The luminescent concrete composition of claim 1, which has a weight percentage of the hydraulic cement ranging from 30-60 wt % relative to a total weight of the luminescent concrete composition.

9. The luminescent concrete composition of claim 1, that does not contain an acetate or ethylene polymer.

10. The luminescent concrete composition of claim 1, wherein the phosphorescent strontium aluminate particles have the formula $Sr_{3.84}Eu_{0.06}Dy_{0.10}Al_{14}O_{25}$.

11. The luminescent concrete composition of claim 1, wherein the phosphorescent strontium aluminate particles have the formula $SrAl_2O_4$.

12. The luminescent concrete composition of claim 1, wherein the luminescent concrete composition having an intensity of glow of from 4 to 8 cd/m² for more than 200 minutes is in the form of a cured concrete block.

* * * * *